United States Patent
Vander Lind et al.

(10) Patent No.: US 11,702,188 B2
(45) Date of Patent: *Jul. 18, 2023

(54) BISTABLE PITCH PROPELLER SYSTEM WITH BIDIRECTIONAL PROPELLER ROTATION

(71) Applicant: Kitty Hawk Corporation, Palo Alto, CA (US)

(72) Inventors: Damon Vander Lind, Alameda, CA (US); Todd Reichert, Mountain View, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,383

(22) Filed: Jan. 12, 2022

(65) Prior Publication Data

US 2022/0219807 A1    Jul. 14, 2022

Related U.S. Application Data

(63) Continuation of application No. 17/001,391, filed on Aug. 24, 2020, now Pat. No. 11,254,419, which is a
(Continued)

(51) Int. Cl.
*B64C 11/32* (2006.01)
*B64C 11/34* (2006.01)
(Continued)

(52) U.S. Cl.
CPC ............ *B64C 11/325* (2013.01); *B64C 11/18* (2013.01); *B64C 11/343* (2013.01); *B64C 11/46* (2013.01);
(Continued)

(58) Field of Classification Search
CPC ...... B64C 11/325; B64C 11/18; B64C 11/343
(Continued)

(56) References Cited

U.S. PATENT DOCUMENTS 2,444,539 A    7/1948   Sharpes
2,455,378 A   12/1948   McCoy
(Continued)

FOREIGN PATENT DOCUMENTS

CN    102011702    4/2011
CN    101520022    3/2013
(Continued)

OTHER PUBLICATIONS

Ma et al., "Aerodynamic Analysis of the Propeller of High-altitude Drone", Aviation Science and Technology, vol. 10, Feb. 5, 2007.
(Continued)

*Primary Examiner* — Michael L Sehn
(74) *Attorney, Agent, or Firm* — Van Pelt, Yi & James LLP

(57) ABSTRACT

A propeller includes a blade free to rotate. A first stop is positioned to mechanically engage one or both of a first portion of the blade and a first structure coupled to the blade when the blade is in a first position at a first end of the rotational range of motion. A second stop is positioned to mechanically engage one or both of a second portion of the blade and a second structure coupled to the blade when the blade is in a second position at a second end of the defined rotational range. The blade rotates to the first position against the first stop when the propeller is rotated in a first direction and to the second position against the second stop when the propeller is rotated in a second direction.

4 Claims, 15 Drawing Sheets

Related U.S. Application Data continuation of application No. 15/225,018, filed on Aug. 1, 2016, now Pat. No. 10,843,790.

(51) Int. Cl.
  *B64C 11/18* (2006.01)
  *B64C 11/46* (2006.01)
  *B64C 27/08* (2023.01)
  *B64C 27/467* (2006.01)
  *B64C 27/80* (2006.01)
  *B64C 29/02* (2006.01)
  *B64U 30/20* (2023.01)

(52) U.S. Cl.
  CPC ............ *B64C 27/08* (2013.01); *B64C 27/467* (2013.01); *B64C 27/80* (2013.01); *B64C 29/02* (2013.01); *B64U 30/20* (2023.01)

(58) Field of Classification Search
  USPC .................................................. 416/46, 140
  See application file for complete search history.

(56) References Cited

U.S. PATENT DOCUMENTS

| | | | |
|---|---|---|---|
| 3,017,932 A | 1/1962 | Chilman |
| 3,207,227 A | 9/1965 | Timewell |
| 3,220,484 A | 11/1965 | Elmer |
| 5,104,291 A | 4/1992 | Morrison |
| 5,551,649 A | 9/1996 | Kaptein |
| 5,593,280 A | 1/1997 | Takada |
| 6,213,713 B1 | 4/2001 | Dickmann |
| 7,462,015 B2 | 12/2008 | Mazet |
| 7,478,995 B2 | 1/2009 | Louis |
| 8,083,482 B2 | 12/2011 | Serven |
| 8,727,266 B2 | 5/2014 | Cardozo |
| 8,790,081 B1 | 7/2014 | Burger |
| 8,794,920 B2 | 8/2014 | Bacic |
| 8,834,119 B2 | 9/2014 | Balk |
| 8,979,496 B2 | 3/2015 | Eyraud |
| 9,284,041 B2 | 3/2016 | Belmonte |
| 10,048,104 B2 | 8/2018 | Colby |
| 2005/0226727 A1 | 10/2005 | Dennis |
| 2010/0209244 A1 | 8/2010 | Lacy |
| 2011/0229319 A1 | 9/2011 | Bacic |
| 2013/0214086 A1 | 8/2013 | Kroo |
| 2015/0183510 A1 | 7/2015 | Vander Lind |
| 2015/0367935 A1 | 12/2015 | Long |

FOREIGN PATENT DOCUMENTS

| | | |
|---|---|---|
| CN | 102167156 | 6/2016 |
| CN | 104512547 | 4/2017 |
| DE | 1045812 | 12/1958 |
| WO | 2008001299 | 1/2008 |
| WO | 2008153423 | 12/2008 |
| WO | 2009084977 | 7/2009 |
| WO | 2013105926 | 7/2013 |

OTHER PUBLICATIONS

Xian-Zhao Meng, "Optimization of Inverse Design of Vibrex 2000 Vibration Value Tester", Mechanical Engineers, 3rd issue, Mar. 10, 2011.

FIG. 1  Not Necessarily to Scale

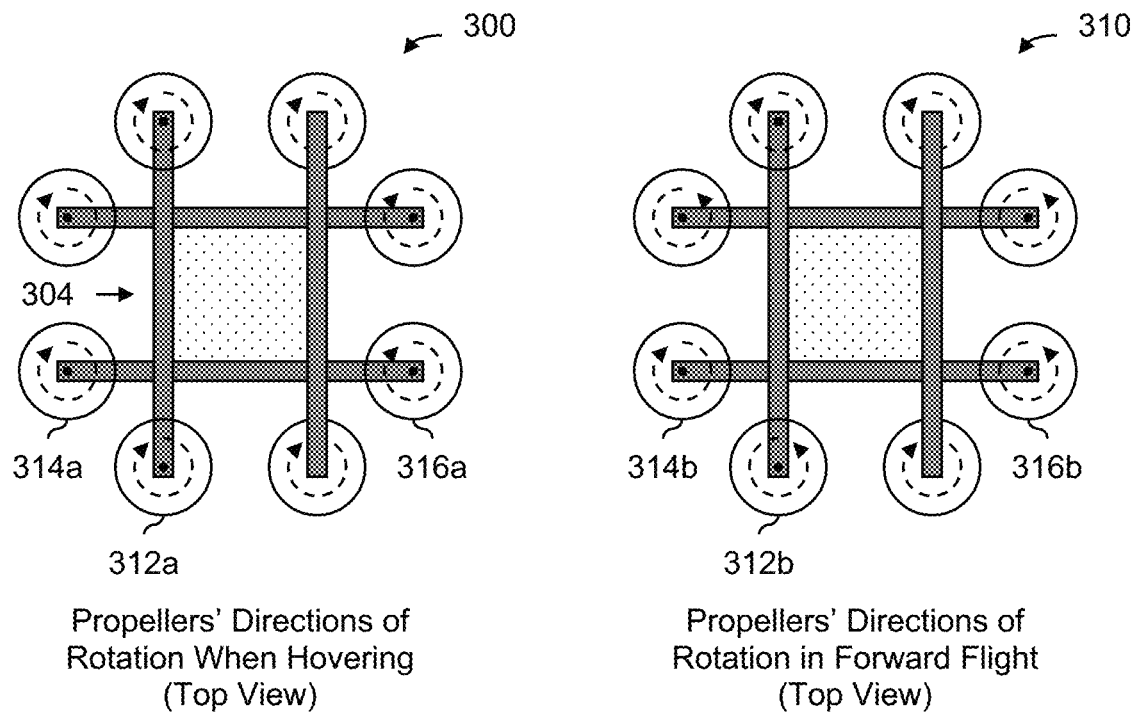
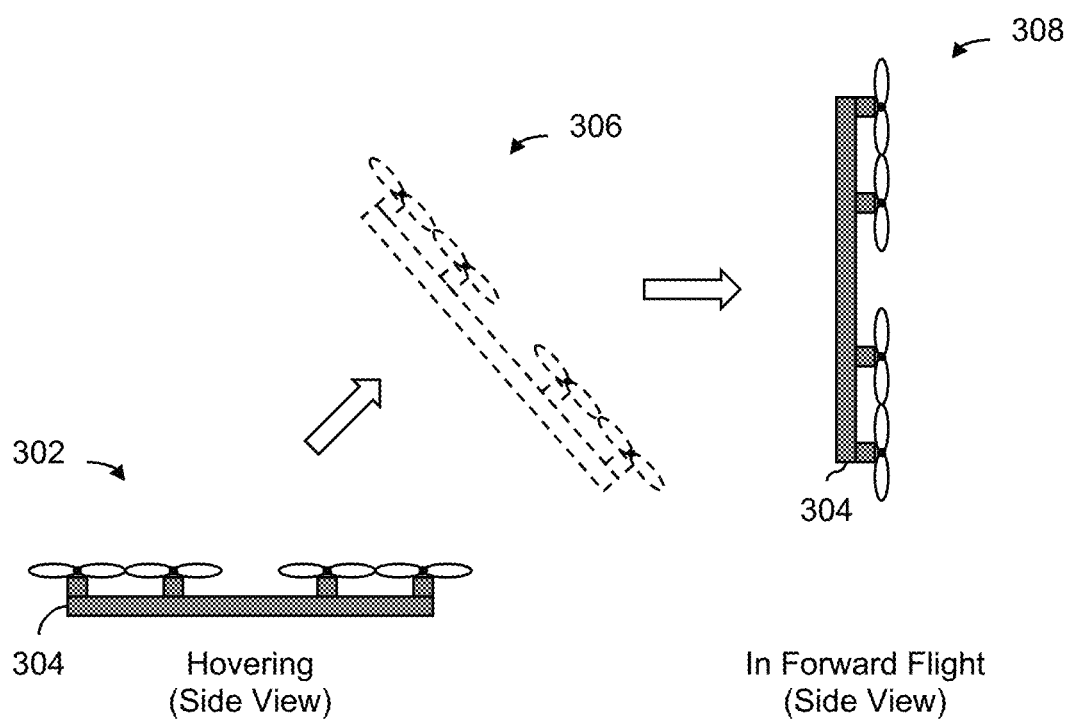
FIG. 3     Not Necessarily to Scale

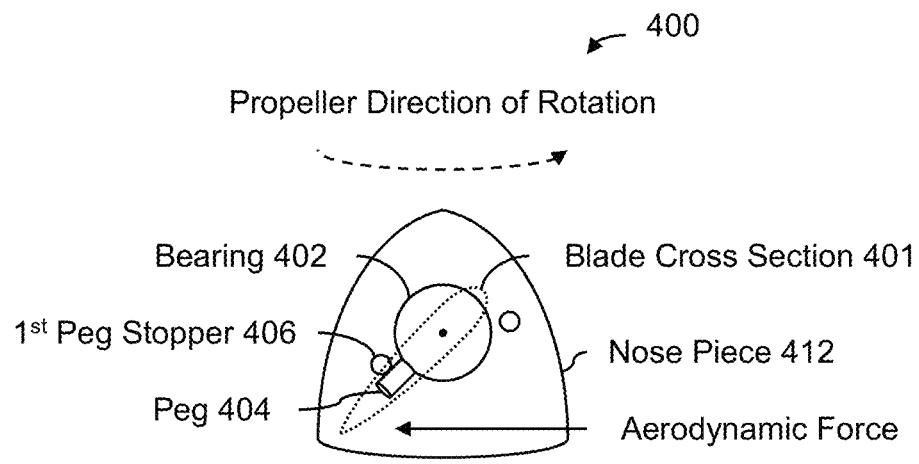
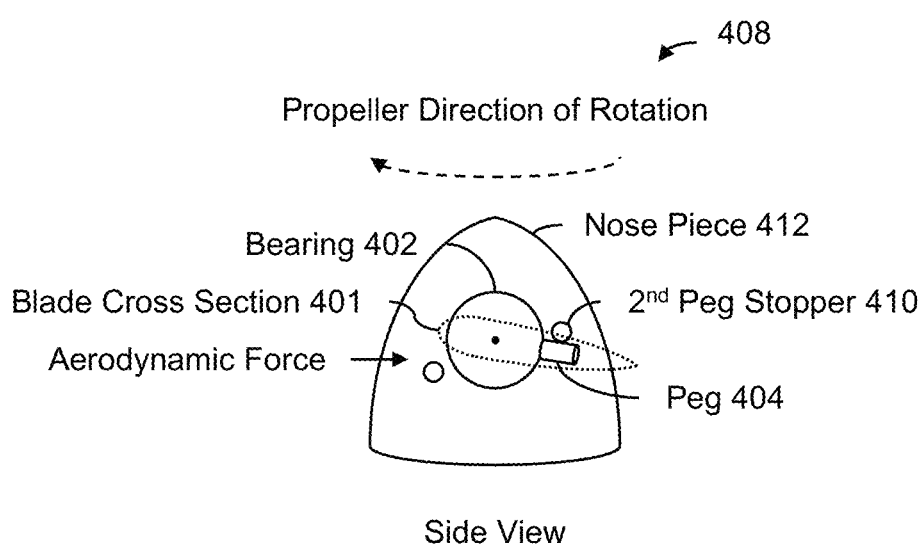
FIG. 4A  Not Necessarily to Scale

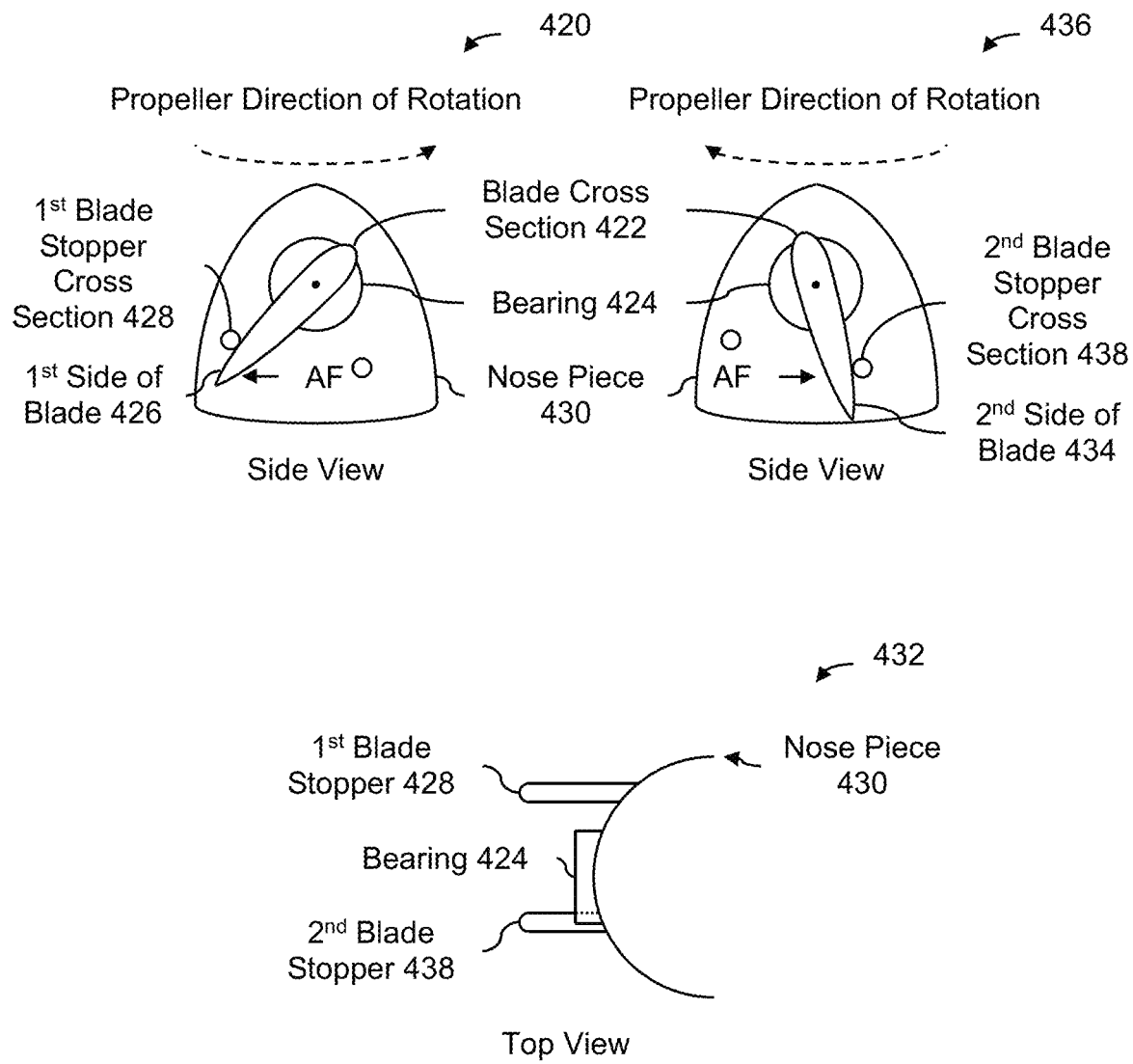
FIG. 4B  Not Necessarily to Scale

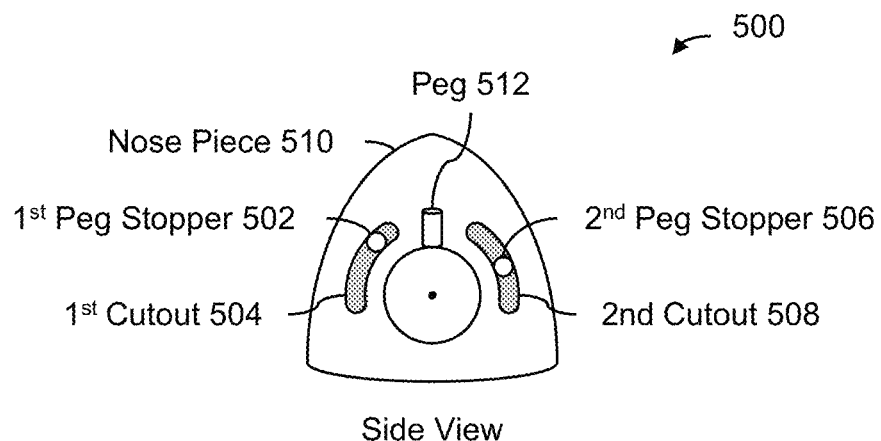
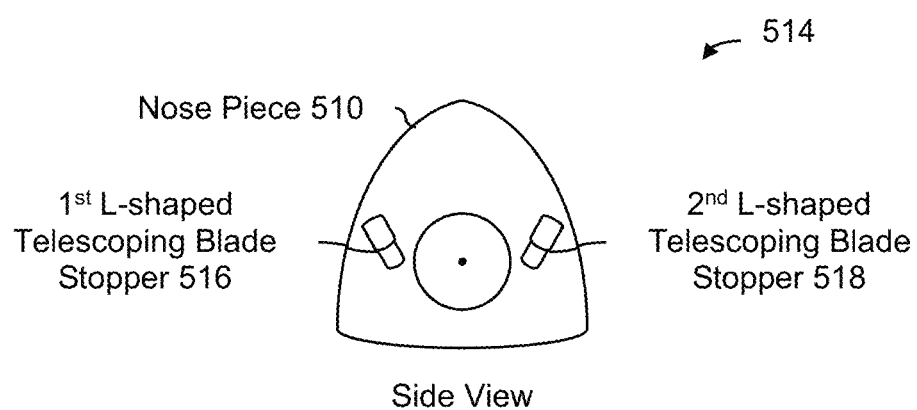
FIG. 5     Not Necessarily to Scale

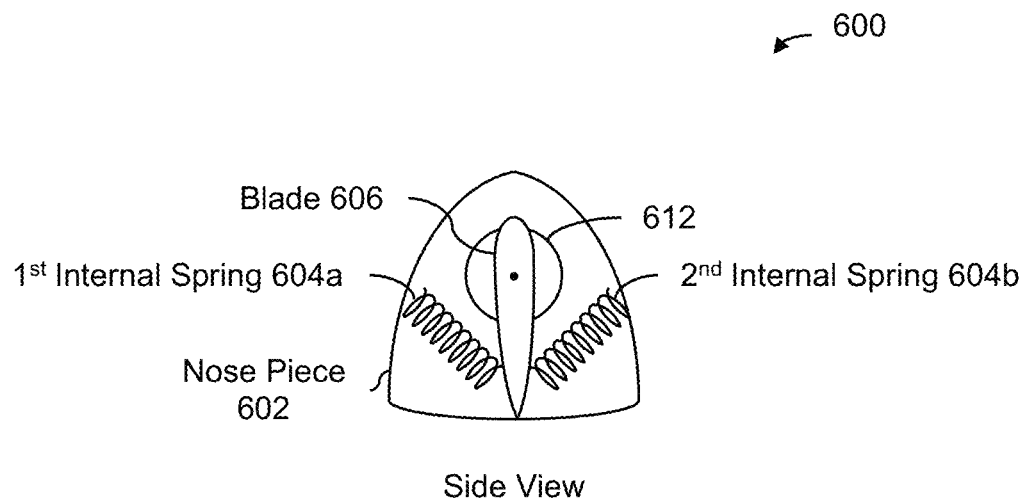
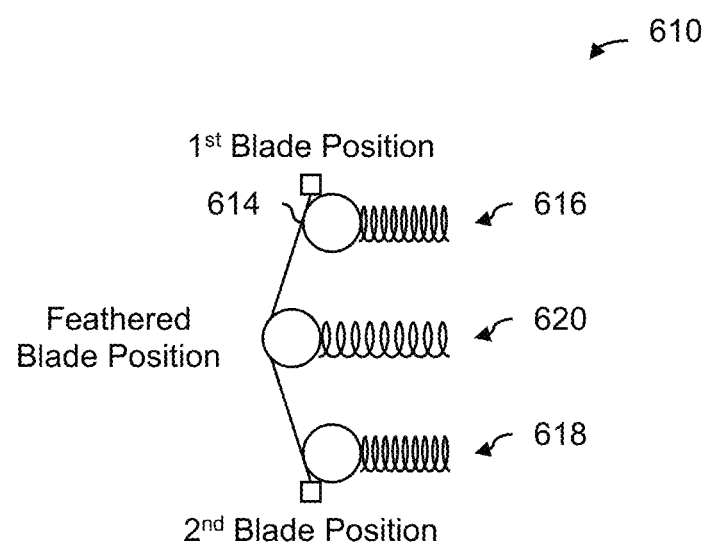
FIG. 6     Not Necessarily to Scale

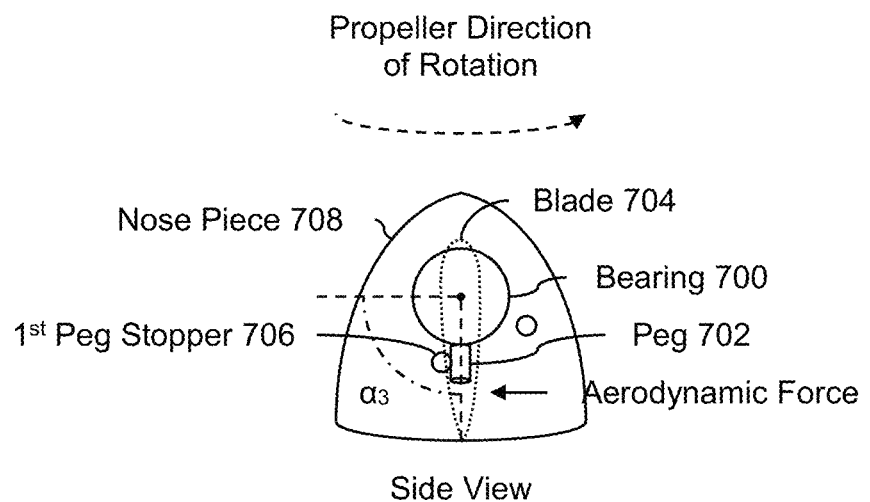
FIG. 7     Not Necessarily to Scale

BISTABLE PITCH PROPELLER SYSTEM WITH BIDIRECTIONAL PROPELLER ROTATION

CROSS REFERENCE TO OTHER APPLICATIONS

This application is a continuation of U.S. patent application Ser. No. 17/001,391, entitled BISTABLE PITCH PROPELLER SYSTEM WITH BIDIRECTIONAL PROPELLER ROTATION filed Aug. 24, 2020, which is a continuation of U.S. patent application Ser. No. 15/225,018, now U.S. Pat. No. 10,843,790, entitled BISTABLE PITCH PROPELLER SYSTEM WITH BIDIRECTIONAL PROPELLER ROTATION filed Aug. 1, 2016, each of which is incorporated herein by reference for all purposes.

BACKGROUND OF THE INVENTION

Rotors (e.g., those used by helicopters) typically are at a single, relatively shallow angle of attack to provide good lift. Propellers (e.g., wing-mounted) typically present a relatively greater angle of attack to more efficiently propel an aircraft through the air. Although systems exist for varying the pitch of a blade (e.g., so that the same propeller can switch between an angle of attack which is good for hovering and another which is good for forward flight), such systems typically use complex mechanical mechanisms that add weight and expense. It would be desirable if new systems could be developed which did not cost as much and/or weight as much.

BRIEF DESCRIPTION OF THE DRAWINGS

Various embodiments of the invention are disclosed in the following detailed description and the accompanying drawings.

FIG. 3 is a diagram illustrating an embodiment of an octocopter which includes bistable pitch propellers.

FIG. 4A is a diagram illustrating an embodiment of peg stoppers which stop a peg connected to a bearing.

FIG. 4B is a diagram illustrating an embodiment of a blade stopper which is designed to come into contact with and stop a blade.

FIG. 5 is a diagram illustrating some embodiments of adjustable stoppers.

FIG. 6 is a diagram illustrating an embodiment of a bistable pitch propeller, where the blades are configured to return to a resting position when the propeller is not rotating.

FIG. 7 is a diagram illustrating an embodiment of a blade being held in a feathered blade position using a peg stopper.

DETAILED DESCRIPTION

Figure 1:
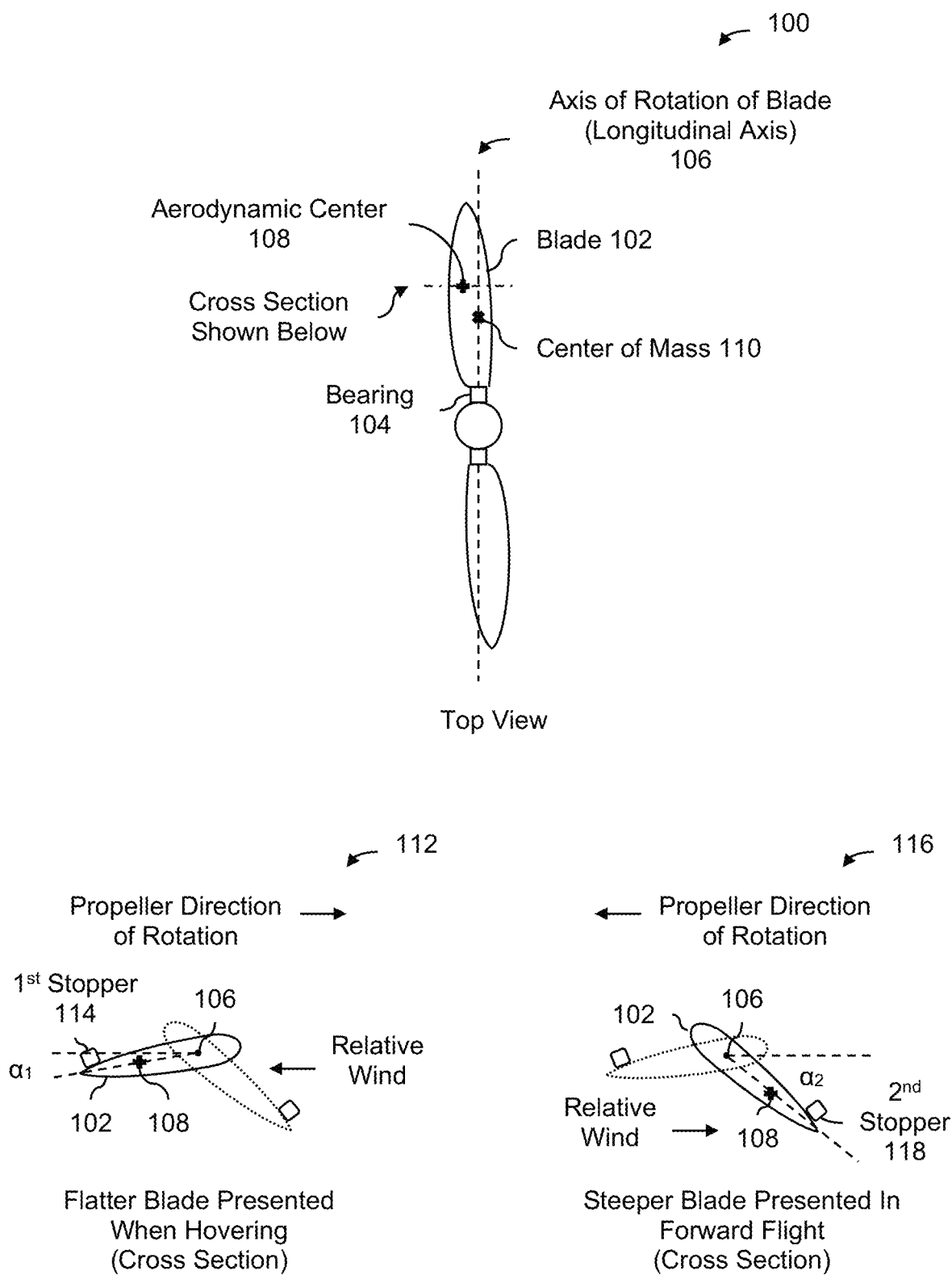
FIG. 1 is a diagram illustrating various views of a bistable pitch propeller embodiment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A propeller that is mechanically stable in two (or more) different positions depending on a direction of rotation in which the propeller is rotated is disclosed. In various embodiments, a propeller blade of the propeller system may be mounted so as to be rotatable about an at least roughly longitudinal axis of the blade. The blade is constructed and mounted such that rotation of the propeller in a first direction of rotation results in the blade rotating (if/as necessary) about the longitudinal axis to a first stable position in which a portion of the blade and/or a structure coupled mechanically to the blade engages a first mechanical stop, resulting in the blade presenting a first angle of attack, while rotation of the propeller in a second (opposite) direction of rotation results in the blade rotating (if/as necessary) about the longitudinal axis to a second stable position in which a portion of the blade and/or a structure coupled mechanically to the blade engages a second mechanical stop, resulting in the blade presenting a second angle of attack. In some embodiments, aerodynamic forces act on the propeller blade to rotate the blade about its longitudinal axis to reach and/or maintain the first or second stable state, as applicable. In some embodiments, other forces (e.g., in addition to or as an alternative to aerodynamic forces) cause the blade(s) to rotate, such as torque or centripetal force. Although some examples herein describe aerodynamic force as the force which causes the blades to rotate, this is not intended to be limiting.

FIG. 1 is a diagram illustrating various views of a bistable pitch propeller embodiment. The bistable pitch propellers described in this figure and below are merely exemplary and are not intended to be limiting. For example, although two blades are shown in this figure, any number of blades may be employed. Similarly, the shape of the blade (e.g., any washout, the blade thickness, the blade width, any tapering, etc.), the position of the axis of rotation, the position of the aerodynamic center, and the position of the center of mass are merely exemplary and are not intended to be limiting.

In this example, diagram 100 shows a top view of the exemplary bistable pitch propeller, which in this example has two blades (102). Each blade is connected to a bearing (104), which permits the blade to rotate about an axis of rotation of the blade (106), sometimes referred to as the longitudinal axis. When the propeller rotates in one direction (e.g., clockwise from the top view shown in diagram 100), the blades pivot on their respective bearings about the axis of rotation of the blade (106). In some embodiments, the blades are relatively lightweight (e.g., to make rotation of the blades about the axis of rotation easier) and the rotation of the propeller causes an aerodynamic force to be applied to the aerodynamic center (108) of the blade. Since the aerodynamic center is not on the axis of rotation, the blade rotates when the propeller rotates.

Diagram 112 shows a cross section of one of the blades when that blade is in a hovering mode or configuration. The rotation of the propeller causes the blade to be pushed because of the aerodynamic force applied to the blade and the blade's ability to rotate about its longitudinal axis (106) (e.g., because of the bearing). The aerodynamic force is sufficiently strong to push and hold the blade against the first stopper (114), holding the blade in that position and at that pitch (i.e., an angle relative to a plane in which the propeller is being rotated). Diagram 112 thus shows a first blade pitch (or, more generally, blade position) at which the pitch propeller is stable in (e.g., the blade is rigid in this position and will not move so long as the propeller is being rotated sufficiently).

In diagram 112, the blade pitch is $\alpha_1$, where $\alpha_1$ is relatively small. A flatter blade is therefore presented to the relative wind (shown in this diagram going from right to left). This flatter blade pitch provides more upward thrust and therefore is good for hovering where upward thrust is desired. For example, $\alpha_1$ may be defined as 0 degrees, and the blade tip might in that case have a twist angle of 10-20 degrees. Although an aircraft may be able to hover when the blade(s) is/are in some other position (e.g., a forward flight position, as is shown in diagram 116), the blade(s) may be put into this position when the aircraft is hovering in order to improve flight performance and/or reduce noise.

Diagram 116 shows a cross section of one of the blades when the propeller rotates in the other direction. The rotation of the propeller in this direction causes the blade to flip in the other direction (e.g., away from the first stopper). As described above, the aerodynamic force being applied to the blade is sufficient to pin or otherwise hold the blade against a second stopper (118). This blade position (pitch) is referred to as a second blade position (pitch).

In this position, the blade pitch is $\alpha_2$ where $\alpha_2 > \alpha_1$. The blade pitch presented to the relative wind (shown in this diagram going from left to right) in this position is therefore steeper. For example, $\alpha_2$ may be within an angular range of 20 to 30 degrees and might therefore have a blade twist that is 30 to 50 degrees at the tip. This steeper blade pitch offers better performance for forward flight, but is not as good for hovering, and may in fact stall in hover. The blade pitch (or, more generally, blade position) shown in diagram 116 is therefore an example of a second blade pitch (or, more generally, blade position) which the pitch propeller is stable in and the blade may be put into this position when the aircraft is in a forward flight mode.

A bistable pitch propeller therefore permits two usable blade pitches (or, more generally, blade positions) using the same propeller and/or blades without requiring electro-mechanical or other structures to drive the blades to one or the other of the positions. In this particular example, the two blade positions are associated with and/or optimized for hovering and forward flight. Naturally, the blade positions of a bistable pitch propeller may be optimized or adjusted for other flight purposes and/or applications; some examples are described in more detail below.

In this example, the center of mass (110) of the blade is on the axis of rotation of the blade (106). In some other embodiments, the center of mass does not lie along the axis of rotation. For example, this may be desirable because inertia will assist in pushing the blade into the first blade position or the second blade position (e.g., when the propeller switches rotational direction).

Some other propellers can be adjusted so that the blades can be in one of a plurality of blade positions or pitches. However, those propeller systems achieve the different blade positions using hydraulics or other control mechanisms which are (as an example) built into the blade itself. In contrast, the propeller described herein does not include such heavy and expensive hardware, making this propeller design potentially lighter and less expensive (among other things).

Generally speaking, a propeller per the technique described herein includes a blade free to rotate about a longitudinal axis of the blade within at least a defined range of motion. A first mechanical stop is positioned to engage mechanically a first portion of the blade (e.g., one of the flat sides) and/or a first structure coupled mechanically to the blade (e.g., a rotatable bearing which is connected to the blade) when the blade is in a first position at a first end of said defined rotational range of motion. A second mechanical stop is positioned to engage mechanically one or both of a second portion of the blade and a second structure coupled mechanically to the blade when the blade is in a second position at a second end of said defined rotational range of motion. An aerodynamic center of the blade lies at a prescribed distance from the longitudinal axis of the blade in a direction such that aerodynamic forces act on the blade to rotate the blade tog the first position against the first mechanical stop when the propeller is rotated in a first direction and to rotate the blade to the second position against the second mechanical stop when the propeller is rotated in a second direction. One example of this is shown in FIG. 1 and other examples are described below.

The following figure more formally describes the various states associated with rotating the propeller in either direction in order to "pin" the blades of the propeller into one of two (stable) positions.

Figure 2:
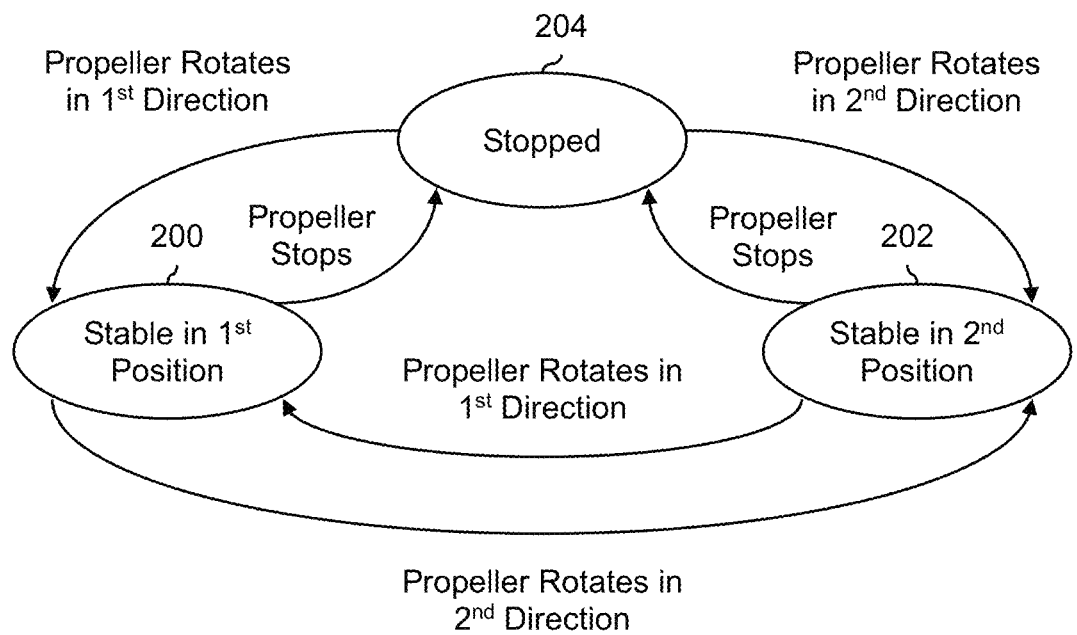
FIG. 2 is a state diagram illustrating an embodiment of states associated with a bistable pitch propeller.

FIG. 2 is a state diagram illustrating an embodiment of states associated with a bistable pitch propeller. In some embodiments, the propeller instructions (e.g., stop, rotate in a first direction, rotate in a second direction) issued by a flight computer (e.g., implemented using a processor and memory) cause a bistable pitch propeller to go through the states shown.

In state 200, a bistable pitch propeller is stable in a first position. To get into this state, a propeller, which includes a rotatable blade, is rotated in a first direction, wherein the rotation of the propeller in the first direction causes the rotatable blade to be in a first blade position. For example, as is shown in FIG. 1, a blade may be able to rotate because it is connected to a bearing which is able to rotate. In diagram 112 in FIG. 1, the rotation of the propeller causes an aerodynamic force to push the blade (102) against the first stopper (114), holding blade (102) in the first blade position shown therein. In that example, the blade pitch shown (i.e., a1) is good for hovering, so (as an example) a propeller may be put into state 200 when the aircraft is hovering or is transitioning to hovering.

In state 202, the bistable pitch propeller is stable in a second state. To get into this state, the propeller is rotated in a second direction different from the first direction, where the rotation of the propeller in the second direction causes the rotatable blade to be in a second blade position different from the first blade position. See, for example, diagram 116 in FIG. 1 which shows the blade (102) in a second blade position. As is shown in FIG. 1, the different blade positions include different blade pitches where a1 a2. The blade position in this diagram is better for forward flight and so (as an example) a propeller may be put into state 202 when the aircraft is in forward flight or is transitioning to forward flight.

When the bistable pitch propeller stops, the propeller goes into the stopped state (204), for example because the aerodynamic force caused by the rotation of the propeller does not push a blade against a first stopper or a second stopper. In some embodiments, a bistable pitch propeller is designed so that the blades go in to some resting position (e.g., using springs) when the propeller is in stopped state 204.

In addition to switching between hovering and forward flight, another example application is when the propeller is used as a wind turbine. If the wind is too strong, too much electricity may be generated. In one example, if the wind is too strong and/or too much electricity is being generated, the propeller will switch directions, causing the blades to be in a new position (e.g., which "catches" the wind to a lesser degree), reducing the amount of electricity generated.

The following figure illustrates an example of an aircraft which uses a bistable pitch propeller. Naturally, the aircraft shown is merely exemplary and is not intended to be limiting.

FIG. 3 is a diagram illustrating an embodiment of an octocopter which includes bistable pitch propellers. In this particular example, four of the octocopter's propellers are bistable pitch propellers and four of the octocopter's propellers are not (e.g., those propellers will always rotate in the same direction). Naturally, some other types of aircraft may be configured differently (e.g., where all of the propellers are bistable pitch propellers and/or some other number of (bi-stable pitch) propellers are included).

Diagram 300 shows a top view of the octocopter when hovering. From this view, the directions of rotation for all of the propellers can be observed. In this mode and for this exemplary aircraft, all of the propellers are rotating in the same direction (in this example, clockwise).

Diagram 302 shows a side view of the octocopter when hovering. From this view, it is apparent that the plane of the octocopter (e.g., created by the four crossbars (304) to which the eight propellers are attached) is horizontal when hovering. In this mode, it is desirable for the propellers to be optimized for hovering, and the propellers' directions of rotation (shown in diagram 300) cause the bistable pitch propellers to have their blades be in a position which is optimized for hovering.

To transition from hovering to forward flight, the octocopter "flips up" so that the plane created by the crossbars (304) is vertical. For example, diagram 306 shows a side view of the octocopter in a transitional position where the plane created by the crossbars is at a diagonal. Diagram 308 shows a side view of the octocopter in forward flight, where the plane created by the crossbars is in a vertical position. In some embodiments, the octocopter flips up by selectively spinning the propellers at different rotational speeds to create a lift differential (e.g., the propellers are fixed to the crossbars and they cannot be angled or repositioned). This lift differential causes one side of the octocopter to flip up (e.g., the left side from the side views shown in diagrams 302, 306, and 308.

Diagram 310 shows a top view of the octocopter in forward flight. As described above, half of the propellers are bistable pitch propellers and the other half are not. In comparing diagram 300 and 310, the bistable pitch propellers can be identified because they are the ones which are rotating in different directions. Note, for example, that propeller 312a in diagram 300 and propeller 312b in diagram 310 are rotating in different directions. Similarly, propeller 316a and 316b rotate in different directions in diagrams 300 and 310, respectively. In contrast, propeller 314a in diagram 300 and propeller 314b in diagram 310 are rotating in the same direction. As shown in this example, in some embodiments, not all of the propellers in an aircraft need to be bistable pitch propellers.

It is noted that the position or mode of the octocopter and propellers are independent and the octocopter can be in one mode (e.g., forward flight) while the propeller is in the other mode (e.g., hovering). For example, in the sequence of diagram 302 to diagram 306 to diagram 308, the propellers may not be switched from hovering mode to forward flight mode until the octocopter has flipped up to a forward flight position (see diagram 308). The blades of the propellers would therefore temporarily be at an angle that better suited to hovering while the octocopter is in forward flight position (e.g., at least until the blades of the propellers were switched to the more efficient forward flight mode). Although the performance may not be optimal (e.g., it may be noisy or not as efficient), it may still be acceptable.

As described above, a variety of stoppers may be employed and the mechanical stopper shown in FIG. 1 is merely one example. The following figures illustrate some other examples.

FIG. 4A is a diagram illustrating an embodiment of peg stoppers which stop a peg connected to a bearing. In the example shown, diagram 400 shows a side view of the exemplary peg stoppers. In this example, a cross section of the blade (e.g., looking towards the nose piece from the tip of the blade) is shown with a dashed line (401), where the blade is attached to the bearing (e.g., extended out of the page). In order to clearly show the peg and peg stoppers, the blade cross section shown in this figure is transparent. The longitudinal axis of rotation of the blade (also not shown) extends out of the page from the center of the bearing (402). The aerodynamic center of the blade (also not shown) is at a height below the height of the axis of rotation of the blade. This permits the bottom portion of the blade to be pushed by an aerodynamic force either towards the first or second peg stopper, depending upon the propeller's direction of rotation.

As in the above example(s), bearing 402 is able to rotate. When the bistable pitch propeller is rotated in the direction shown in diagram 400 (e.g., counterclockwise when looking down on the nose piece from above), an aerodynamic force pushes on the blade (not shown), which causes the blade and the bearing to rotate towards the first peg stopper (406). A peg (404) is attached to and radiates outward from the bearing (402) and the bearing rotates until the peg is stopped by the first peg stopper (406). In this example, the peg stoppers are connected to the nose piece (412) so that the peg stoppers can stop the peg from moving further, even while the propeller rotates. As is shown in this diagram, the first peg stopper stops the blade at a first blade position (e.g., a first blade pitch) while the propeller is rotating the direction shown.

Diagram 408 shows the bistable pitch propeller rotating in the opposite direction. In this direction, an aerodynamic force causes the bearing and peg to rotate towards the second peg stopper (410). The rotation in this direction is eventually stopped by the second peg stopper (410) forcing the peg to stop. This holds the blade (a cross section of which is shown with a dashed line) at a second blade position (e.g., a second blade pitch).

To achieve a desired blade position, a peg stopper is attached to the nose piece to stop the peg at the appropriate position (e.g., to achieve a steeper blade angle or a more feathered blade angle). The blade positions or pitches shown here are merely exemplary and are not intended to be limiting. Some examples are described below where the position of a stopper is adjustable so that the first blade position and/or second blade position is/are not necessarily fixed (e.g., the peg stoppers are not welded directly to the nose piece, which would cause them to remain in a fixed position).

Although the peg and bearing are shown here with a seam (e.g., from welding or otherwise attaching the peg and bearing together), the peg and bearing may comprise a single piece of metal or other material (e.g., the peg and bearing are cast or cut as a single piece of metal). In various embodiments, a peg and/or a peg stopper may comprise a variety of shapes and/or materials. For example, a peg stopper may be made of metal (e.g., for strength and/or durability) and have a rubber sleeve or cover (e.g., to cushion the peg which may be pushed forcefully into the peg stopper, given the expected high propeller speeds). In some embodiments, a peg stopper has substantially the same height as a peg (e.g., to increase the area where the peg and peg stopper come into contact which better distributes the pressure and/or to more securely attach the peg stopper to the nose piece). In some embodiments, the peg and peg stopper have matching surfaces where they come into contact with each other (e.g., both have a flat surface where they make contact and the flat surfaces match up) to increase the area where they come into contact with each other.

The following figure shows a different embodiment where a stopper is designed to come into direct contact with the blade (e.g., as opposed to this figure).

FIG. 4B is a diagram illustrating an embodiment of a blade stopper which is designed to come into contact with and stop a blade. In the example shown, diagram 420 shows a side view when the bistable pitch propeller is rotating in a first direction (e.g., counterclockwise when looking down on the nose piece from above). When the propeller is rotating in this direction, an aerodynamic force pushes against the blade (422), causing the bearing (424) which is attached to the blade to rotate. The rotation of the blade and bearing is stopped when one (e.g., substantially flat) side of the blade (426) comes into contact with a first blade stopper (428); this holds the blade in a first blade position when the propeller is rotating in the direction shown.

Diagram 432 shows a top view; for clarity, the blade is not shown. As is shown in this view, the first blade stopper (428) and second blade stopper (438) are attached to the nose piece (430), radiating outward so that it can make contact with the blade (not shown).

Diagram 436 shows a side view when the propeller rotates in the other direction (e.g., clockwise when looking down on the nose piece from above). In this case, the aerodynamic force causes the blade to be pushed in the other direction, where the blade is stopped by the second blade stopper (438). In this case, the second side of the blade (434) is in contact with the second blade stopper.

For clarity, the exemplary blade cross section shown here has a relatively simple design or shape but this is not intended to be limiting. A blade used in a real-world embodiment may have a design or shape which is optimized to achieve a variety of design and/or performance objectives.

In various embodiments, the shape and/or materials(s) of a blade stopper may vary. For example, the shape of the blade stoppers may be aerodynamic since the propeller is expected to have a relatively high rate of rotation. In some embodiments, a blade stopper is made of metal with a rubber sleeve or cover.

As described above, in some embodiments, the position of a stopper is adjustable, such that the first blade position and/or the second blade position is adjustable. The following figure illustrates some examples of adjustable stoppers.

FIG. 5 is a diagram illustrating some embodiments of adjustable stoppers. Diagram 500 shows a side view of adjustable peg stoppers. In this example, the position of the first peg stopper (502) can be positioned anywhere within the first cutout (504) and the second peg stopper (506) can be positioned anywhere within the second cutout (508). By adjusting the position of a peg stopper within a cutout, the blade position (e.g., when the propeller is rotated and the peg is stopped by the appropriate peg stopper) can be varied. Naturally, the shape of the cutout (in this example, circular) is merely exemplary and is not intended to be limiting. In some other embodiments, the cutout is L-shaped, vertical, horizontal, diagonal, etc.

In various embodiments, a variety of adjustment mechanisms may be used in diagram 500. In one example, the peg stoppers are designed to be manually adjusted, for example, using an exposed knob or using a screwdriver to turn an exposed screw head. Turning the screw head or knob in turn causes a corresponding peg stopper to move (for example) clockwise/counterclockwise, up/down, left/right within a cutout.

In some embodiments, the nose piece (510) includes actuators which permit the automatic (that is, non-manual) adjustment of the first and/or second peg stoppers within the first and second cutouts, respectively. In one example, when the propeller is not rotating or when the peg (512) is stopped by the first peg stopper, the second peg stopper can be moved within the second cutout using the appropriate actuator. Then, when the propeller is rotated in the other direction, the new position of the second peg stopper will cause the blade to stop in a new, second blade position. This permits the propeller to go through a sequence of three or more blade positions between takeoff and landing (e.g., (1) rotate propeller clockwise and blade pitch=$\alpha_1$, (2) rotate propeller counterclockwise and blade pitch=$\alpha_2$, (3) adjust first peg stopper, (4) rotate propeller clockwise and blade pitch=$\alpha_3$, etc.). Some examples of user interfaces associated with setting a blade position and/or stopper position are described in more detail below.

Diagram 514 illustrates a side view of an example of L-shaped, telescoping blade stoppers. In this example, the first blade stopper (516) and second blade stopper (518) are telescoping, which permits the length of the blade stoppers to be adjusted. This, in turn, stops the blade at varying blade positions or blade pitches when the propeller is rotated in the appropriate direction. Since a blade will come into contact with a telescoping blade stopper at a variety of angles (e.g., depending upon the height of the stopper), the telescoping blade stoppers have rounded ends where the stopper comes into contact with a side of the blade. In some embodiments, some other tip shape is used. In some embodiments, the end or tip of a telescoping blade stopper is rubberized.

As described above, a variety of mechanisms (e.g., manual adjustment using screw(s) and/or knob(s) or automatic adjustment using actuators) may be used to adjust the height of the telescoping blade stoppers. As described above, in some embodiments the adjustment mechanism is a manual adjustment mechanism and in other embodiments the adjustment mechanism is an automatic adjustment mechanism.

The ability to adjust the first and/or second blade position may be especially desirable in wind turbine applications. In wind turbine applications, the pitch of the blade is adjusted depending upon wind strength. When the wind is too strong and too much electricity is being generated, the pitch of the blade is adjusted so that the blades are more feathered, reducing the amount of electricity produced. If the wind dies down too much, then the pitch of the blade may be adjusted so that the blades are at a steeper angle, increasing the amount of electricity produced.

In some embodiments, the blades of a bistable pitch propeller are configured to return to a certain position when the propeller is not rotating. The following figure shows one such example.

FIG. 6 is a diagram illustrating an embodiment of a bistable pitch propeller, where the blades are configured to return to a resting position when the propeller is not rotating. In this example, the resting position is a feathered position.

In the example shown, diagram 600 shows the nose piece (602) with two internal springs (604a and 604b). When the propeller is not rotating, there is no aerodynamic force which pushes down the blade (606) towards either the first mechanical stop or the second mechanical stop (not shown). The first internal spring and second internal spring therefore collectively push the blade to the center (i.e., a feathered position). In this example, the internal springs are relatively weak such that when the propeller is rotating in either direction, the expected aerodynamic force is greater than the force exerted by the internal springs and the blades can be pushed and held in the first or second blade position.

Diagram 610 shows an interior view of the nose piece. In this diagram, part of the bearing (not shown in diagram 610) is connected to a spring-mounted ball bearing (614). It is noted that the spring-mounted ball bearing (614) is different from bearing 612. When the propeller is rotated in a first direction and the blade is in the first blade position because of the first peg stopper, the spring-mounted ball bearing is in position 616. When the propeller is rotated in the other direction and the blade is in the second blade position because of the second peg stopper, the spring-mounted ball bearing is in position 618. When the propeller is not rotating there is no aerodynamic force pushing against the blade and so the internal springs shown in diagram 600, as well as the sloped surface, will cause the spring-mounted ball bearing to come to a rest in position 620 (i.e., the resting, feathered position when the propeller is not rotating). The placement of the "dip" or minima in the sloped surface therefore dictates where the resting position will be. In this example, the slope(s) (e.g., between positions 616, 620, and 618) is/are relatively shallow and the springs are relatively weak. This permits the expected aerodynamic force to push the blade (e.g., at rest) out of the resting position shown and into the first or second blade position when the propeller is rotating.

Naturally, the mechanisms shown here which cause the blade to go to a resting position (in this example, a feathered position) when the propeller is not rotating are merely exemplary and are not intended to be limiting. Any (e.g., mechanical) mechanism which returns the blade to some desired resting position when the propeller is not rotating may be used.

In some cases, it may be desirable to have the feathered blade position shown here be one of the blade positions created or defined by a stopper. The following figure shows an example of this.

FIG. 7 is a diagram illustrating an embodiment of a blade being held in a feathered blade position using a peg stopper. In the example shown, a peg stopper embodiment is shown, but naturally the concepts may be extended to other embodiments. As described above, a bearing (700) which is able to rotate has a peg (702) attached to it. When the propeller is rotated in the direction shown (e.g., counterclockwise when looking down on the nose piece from above), an aerodynamic force pushes the blade (704) until the peg comes up against the first peg stopper (706) where the first peg stopper is connected to the nose piece (708). This causes the blade to be held at a feathered blade position where $\alpha_3$=90°. For example, if the bistable pitch propeller is being used in a wind turbine application, then it may be desirable to have one of the blade positions defined or created by a stopper be a feathered blade position. The blades may be put into this position when the wind is too strong (e.g., there is a storm) and too much electricity is being generated.

As is shown in FIG. 5, the position of a stopper (and thus a blade position when a bistable pitch propeller is rotating) is adjustable in some embodiments. The following figure illustrates some example user interfaces which may be presented to a pilot or user when there is an automatic adjustment mechanism (e.g., as opposed to a manual adjustment).

Figure 8:
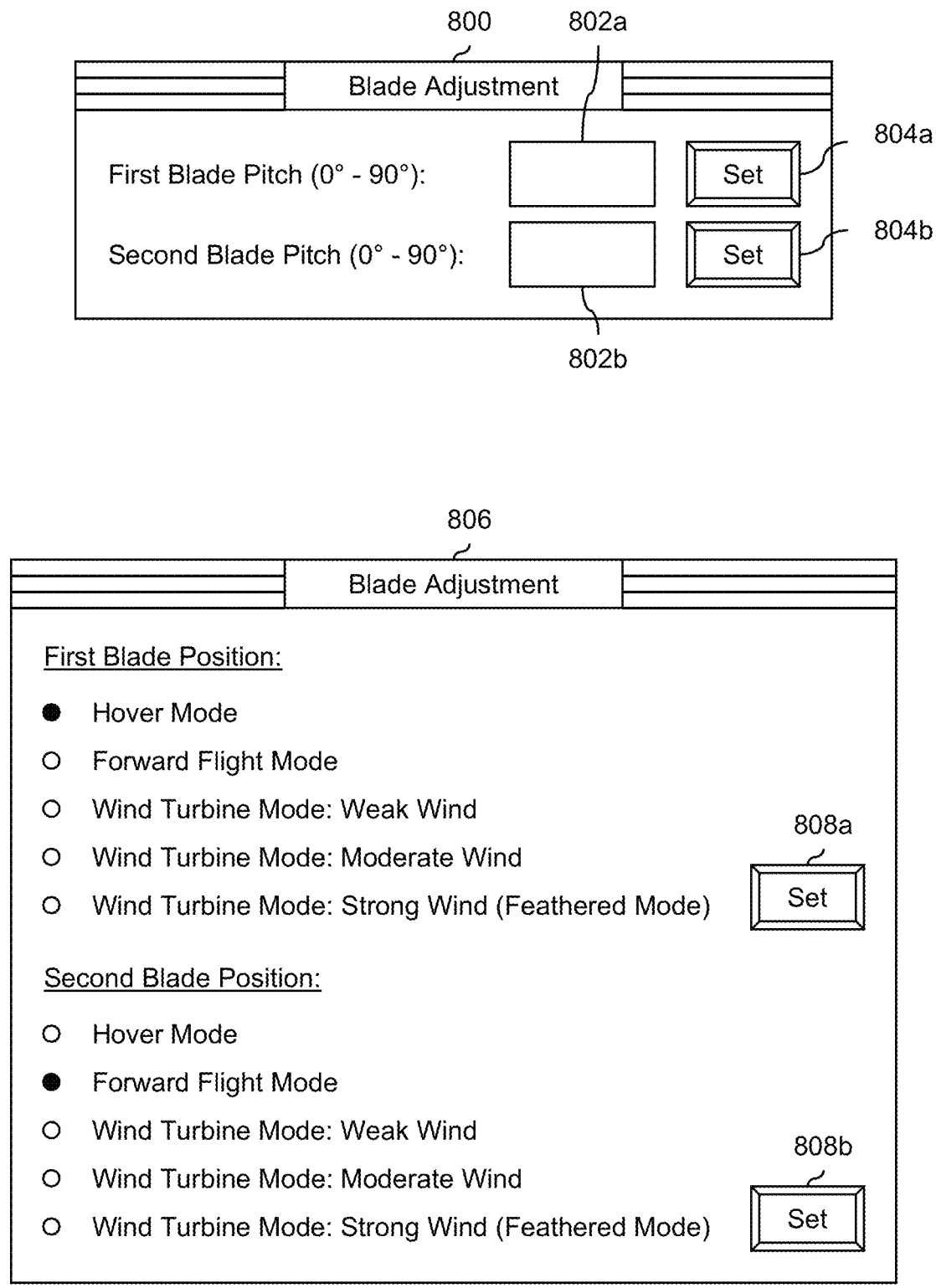
FIG. 8 is a flowchart illustrating various embodiments of user interfaces associated with adjusting the position of a blade.

FIG. 8 is a flowchart illustrating various embodiments of user interfaces associated with adjusting the position of a blade. In some embodiments, the user interface is presented to a pilot or other user by a flight computer (e.g., implemented using a processor and memory) when a stopper has an automatic adjustment mechanism.

User interface 800 shows an example of a user interface where the pilot or user is permitted to specify the desired blade pitches (e.g., explicitly). To change or otherwise set the first blade pitch, the user can input a number (in this example, between 0° and 90°) in input box 802a and press the set button (804*a*). The flight computer then moves the adjustable stopper (see, for example, FIG. 5) to a position which corresponds to the specified blade pitch. Similarly, a desired blade pitch can be specified for the second blade pitch using input box 802*b* and set button 804*b*.

User interface 806 shows an example of a user interface where the pilot or user selects a flight mode from a plurality of presented flight modes. In this example, user interface 806 permits the pilot or user to select a hover mode, a forward flight mode, a wind turbine mode when the wind is weak, a wind turbine mode when the wind is moderate, or a wind turbine mode when the wind is strong (i.e., a feathered mode). To set the first blade position, the desired mode is selected by clicking on the appropriate radio button and set button 808*a* is pressed. Similarly, the second blade position can be set or otherwise adjusted by selecting the desired mode and pressing set button 808*b*. Each flight mode may have a corresponding stopper position (e.g., corresponding to a blade pitch which is optimized for that particular mode or application) and the appropriate stopper is moved to that stopper position.

As described above, in some embodiments an aircraft includes multiple bistable pitch propellers. See, for example, FIG. 3. In such embodiments, the user interface may include independent controls for each bistable pitch propeller.

In some embodiments, a given stopper can only be adjusted at certain times (e.g., when the propeller is not rotating or when the blade is being held in position by the other stopper). If so, this may be handled by the user interface in a variety of ways in various embodiments. In some embodiments, the user interface does not permit the pilot or user to specify a desired blade pitch or desired mode when a given stopper cannot be adjusted. For example, in user interface 800 and user interface 806, the affected input box, radio buttons, and/or set button may be disabled and the user may not be able to select those controls and/or input values into those controls. In some other embodiments, the pilot or user is able to specify a desired blade pitch or desired flight mode at any time, but the user interface informs the pilot or user that the change will not be made right away. When the appropriate stopper is able to be adjusted (e.g., because the blade flips over to the other stopper or the propeller stops rotating), the user interface may be updated to inform the pilot or user that the change has been made.

The following figures more formally describe how information received from a user interface may be used to change the position of an adjustable stopper.

Figure 9A:
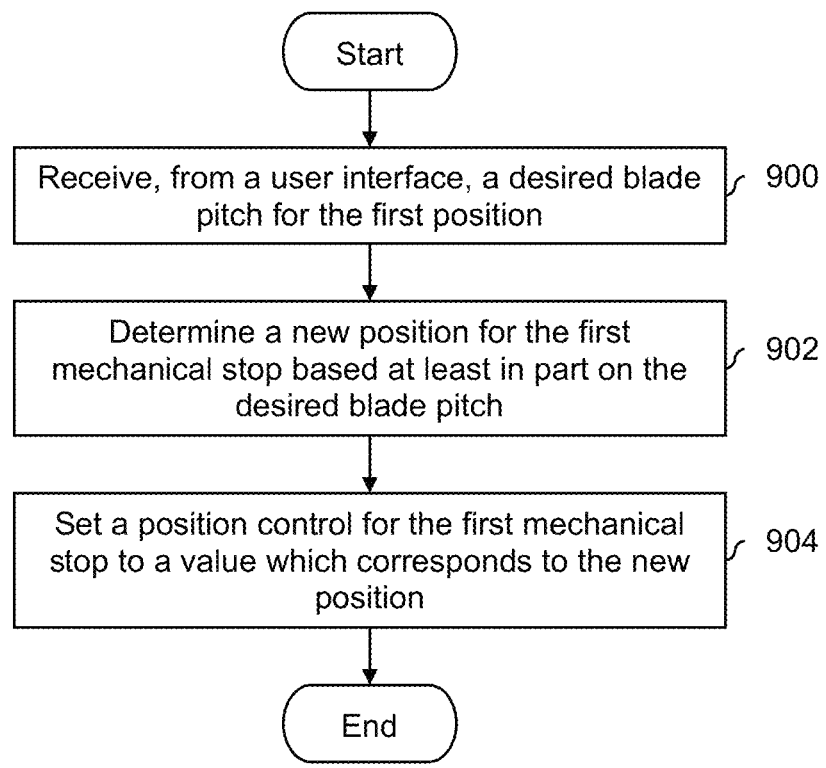
FIG. 9A is a flowchart illustrating an embodiment of a process to receive a desired blade pitch from a user interface and adjust the position of a mechanical stop accordingly.

FIG. 9A is a flowchart illustrating an embodiment of a process to receive a desired blade pitch from a user interface and adjust the position of a mechanical stop accordingly. At 900, a desired blade pitch for the first position is received from a user interface. See, for example, user interface 800 in FIG. 8. At 902, a new position for the first mechanical stop is determined based at least in part on the desired blade pitch. For example, there may be some lookup table which maps the desired blade pitch to a corresponding position of the stopper. At 904, a position control for the first mechanical stop is set to a value which corresponds to the new position. For example, a control for an actuator may be set to some value which causes the stopper to be moved to the new position determined at step 902.

Figure 9B:
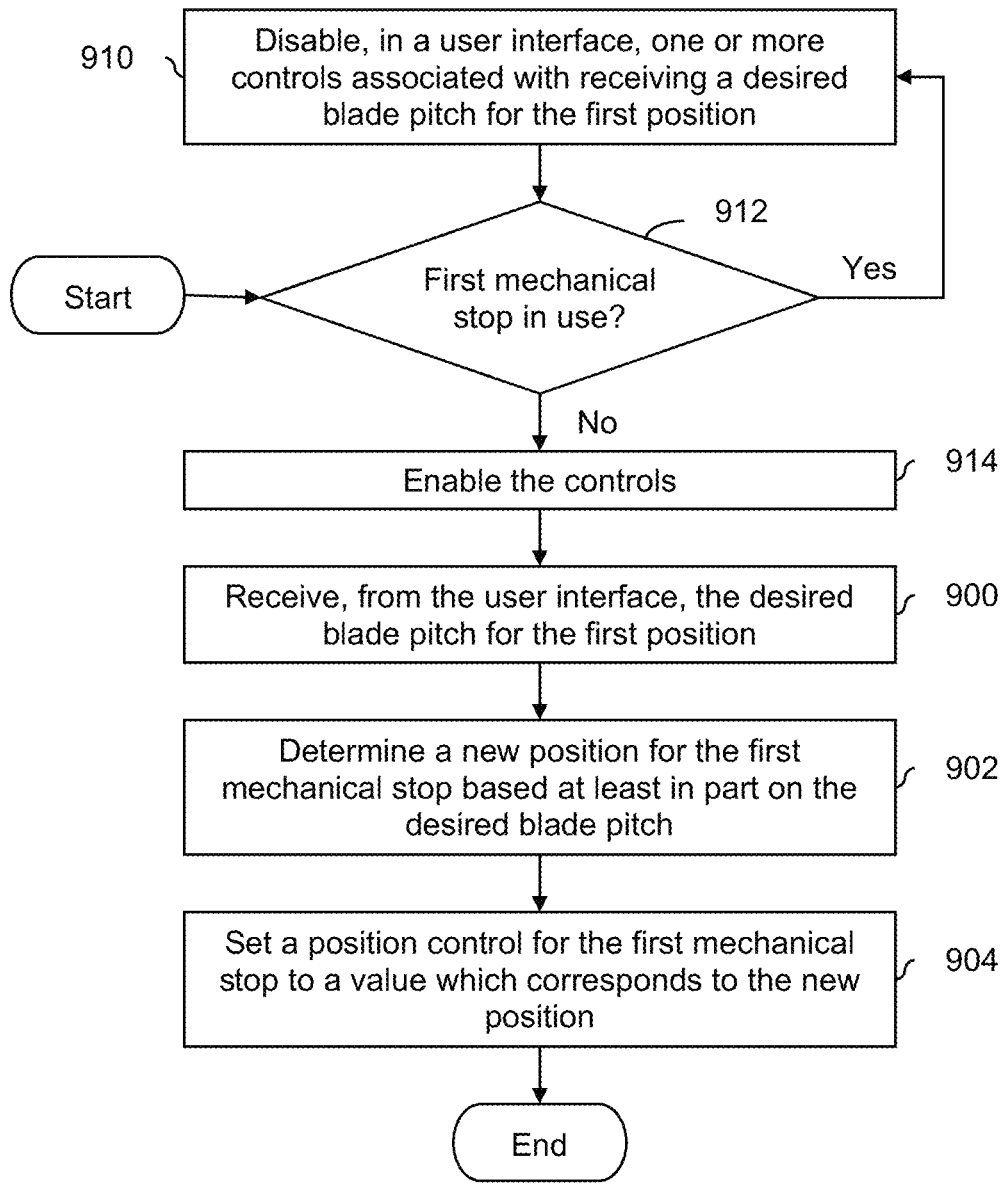
FIG. 9B is a flowchart illustrating an embodiment of a process to receive a desired blade pitch from a user interface and adjust the position of a mechanical stop accordingly where the user interface is disabled if the mechanical stop is in use.

FIG. 9B is a flowchart illustrating an embodiment of a process to receive a desired blade pitch from a user interface and adjust the position of a mechanical stop accordingly where the user interface is disabled if the mechanical stop is in use. For brevity, steps that are similar to those described above (e.g., identified by identical reference numbers) are not discussed in detail here.

At 912, it is determined if a first mechanical stop is in use. For example, as described above with respect to FIG. 8, the first mechanical stop may only be permitted to be moved if the propeller is not rotating or the second stopper is the one currently holding the blade or peg in place.

If it is determined that the first mechanical stop is in use at 912, then one or more controls associated with receiving a desired blade pitch for the first position are disabled in a user interface 910. For example, in user interface 800 in FIG. 8, a user would not be able to select and/or input values into input box 802*a* or set button 804*a* if the first mechanical stop is holding the blade in the first blade position or pitch. Similarly, in user interface 806, the radio buttons and set button 808*a* may be disabled (e.g., un-selectable) if the first mechanical stop is holding the blade in the first blade position or pitch. In this example, the process stays in this loop until the first mechanical stop is no longer in use.

Once (or if) the first mechanical stopper is determined to not be in use at step 912, the controls are enabled at 914. This, for example, permits the user to select the previously disabled controls. At 900, the desired blade pitch for the first position is received from the user interface. At 902, a new position is determined for the first mechanical stop based at least in part on the desired blade pitch. At 904, a position control for the first mechanical stop is set to a value which corresponds to the new position.

Figure 9C:
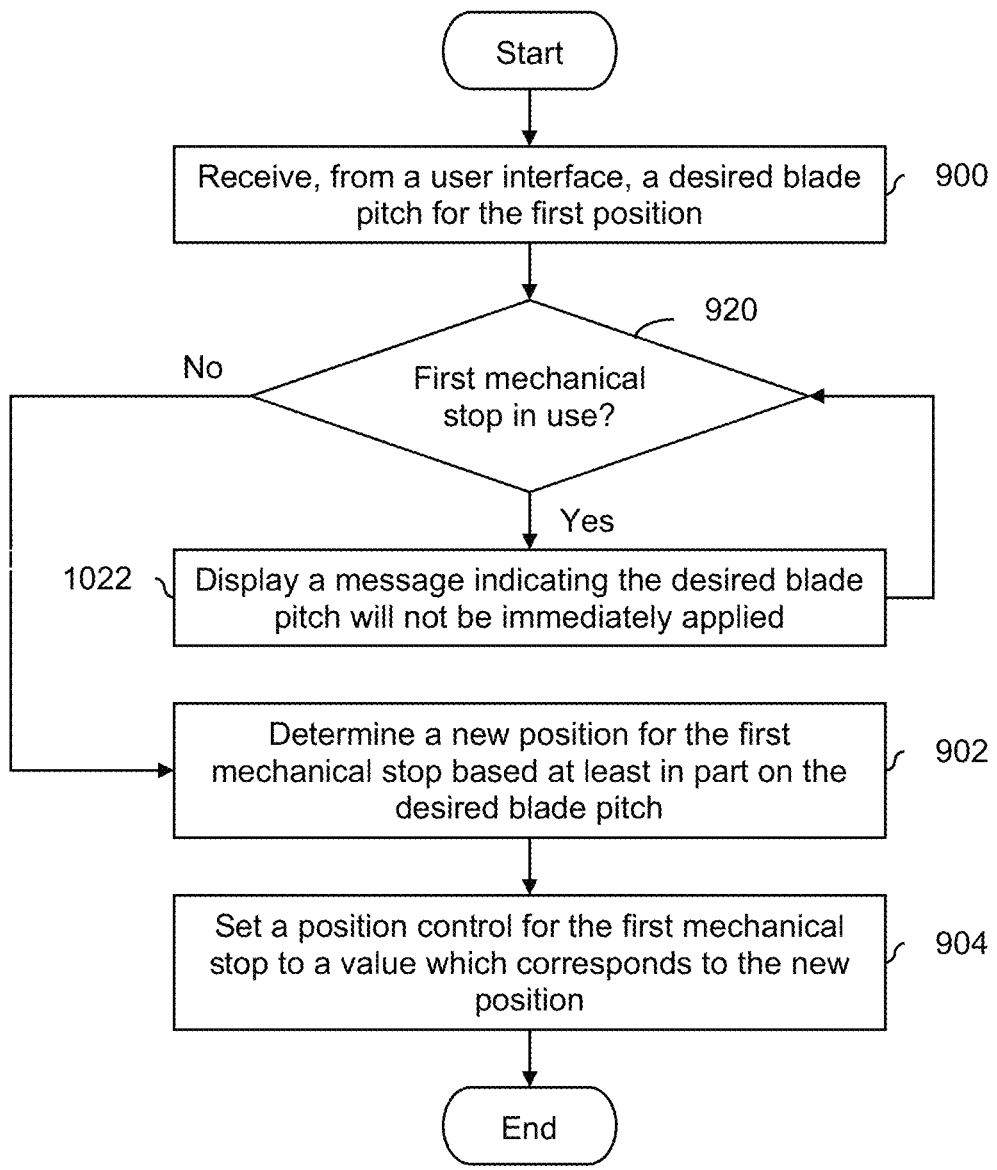
FIG. 9C is a flowchart illustrating an embodiment of a process to receive a desired blade pitch from a user interface and adjust the position of a mechanical stop accordingly where the desired blade pitch is held until the mechanical stop is free.

FIG. 9C is a flowchart illustrating an embodiment of a process to receive a desired blade pitch from a user interface and adjust the position of a mechanical stop accordingly where the desired blade pitch is held until the mechanical stop is free. As before, steps previously described are not discussed in detail here for brevity.

At 900, a desired blade pitch for the first position is received from a user interface. At 920, it is determined if a first mechanical stop is in use.

If the first mechanical stop is determined to be in use at 920, a message indicating that the desired blade pitch will not be immediately applied is displayed at 922. In this example, the process stays in this loop until the first mechanical stop is no longer in use (e.g., because the propeller has stopped rotating or the propeller has switched directions of rotation). In this embodiment, the user interface permits a desired blade pitch to be specified or otherwise input, but then holds on to that pitch without actually making any changes until the relevant mechanical stop is no longer being used to hold or otherwise stop the blade or peg (as an example). In various embodiments, the content of a message displayed at step 922 may vary. In some embodiments, the message is fairly simple (e.g., "Waiting"). In some embodiments, the message identifies that the wait is due to the stopper being in use (e.g., "The blade pitch will be changed when the propeller is turned off or the propeller switches directions.").

Once (or if) the first mechanical stop is determined to not be in use at 920, a new position for the first mechanical stop is determined based at least in part on the desired blade pitch at 902. In some embodiments, a second message is displayed to the user, indicating that the desired blade pitch has been applied (e.g., "Done" or "The blade pitch has been changed").

At 904, a position control for the first mechanical stop is set to a value which corresponds to the new position.

Figure 10A:
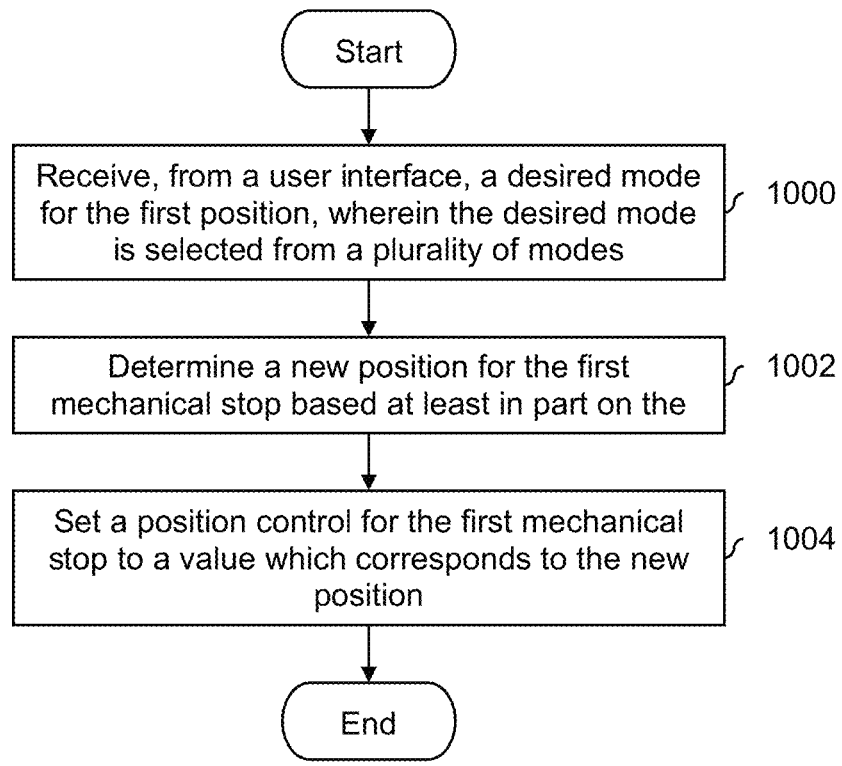
FIG. 10A is a flowchart illustrating an embodiment of a process to receive a desired mode from a user interface and adjust the position of a mechanical stop accordingly.

FIG. 10A is a flowchart illustrating an embodiment of a process to receive a desired mode from a user interface and adjust the position of a mechanical stop accordingly. At 1000, a desired mode for the first position is received from a user interface, wherein the desired mode is selected from a plurality of modes. See, for example, user interface 806 in FIG. 8 where multiple modes are presented and the user selects one. At 1002, a new position is determined for a first mechanical stop based at least in part on the desired mode. In some embodiments, each possible mode (e.g., presented to the user) has a corresponding position for the mechanical stop pre-determined. In some embodiments, a lookup table is used to map a desired mode to a new mechanical stop position. At 1004, a position control for the first mechanical stop is set to a value which corresponds to the new position. As described above, there may be an actuator to move a peg within a cutout or adjust the height of a telescoping blade stopper, and some control input to the actuator may be set to the appropriate value.

Figure 10B:
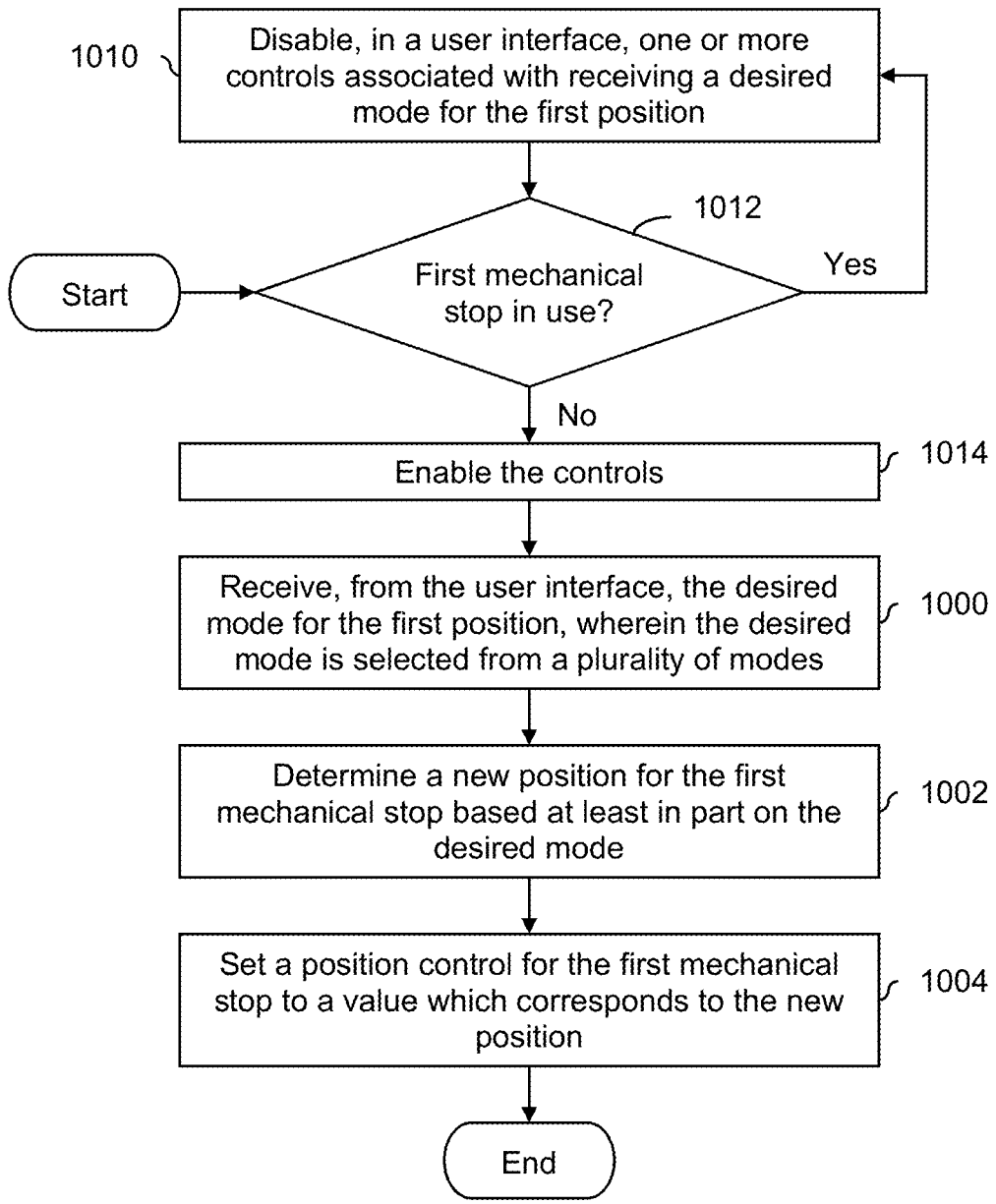
FIG. 10B is a flowchart illustrating an embodiment of a process to receive a desired mode from a user interface and adjust the position of a mechanical stop accordingly where the user interface is disabled if the mechanical stop is in use.

FIG. 10B is a flowchart illustrating an embodiment of a process to receive a desired mode from a user interface and adjust the position of a mechanical stop accordingly where the user interface is disabled if the mechanical stop is in use. For brevity, steps that have been previously discussed are not discussed in detail here.

At 1012, it is determined if a first mechanical stop is in use. If so, one or more controls associated with receiving a desired mode for the first position are disabled in a user interface at 1010. As described above, this may include making controls un-selectable and/or not permitting inputs or other values to be entered. In this example, the process stays in this loop until the first stopper is no longer in use.

Once (or if) the first mechanical stop is determined to not be in use at step 1012, the controls are enabled at 1014. At 1000, the desired mode for the first position is received from the user interface, wherein the desired mode is selected from a plurality of modes. At 1002, a new position for the first mechanical stop is determined based at least in part on the desired mode. At 1004, a position control for the first mechanical stop is set to a value which corresponds to the new position.

Figure 10C:
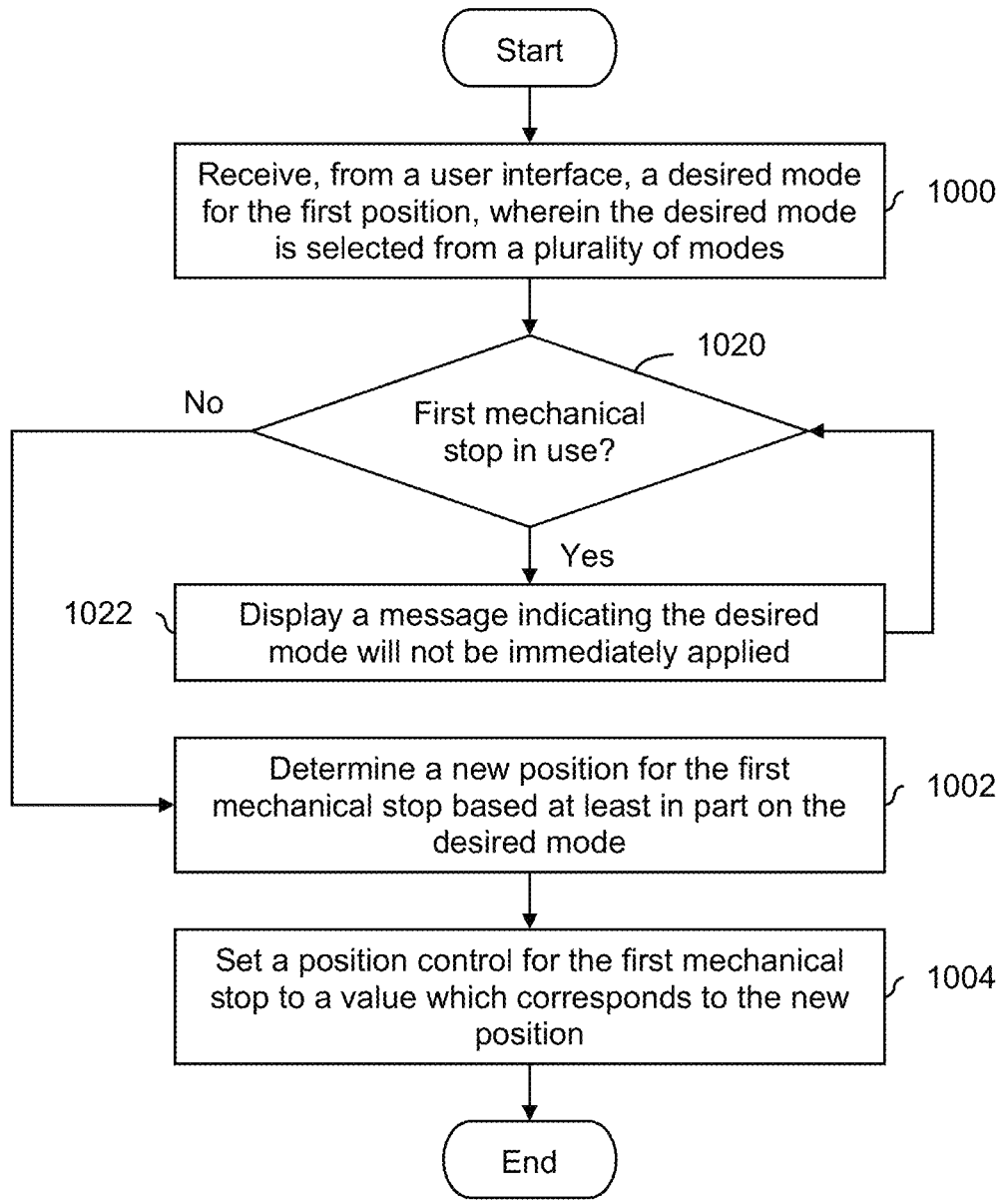
FIG. 10C is a flowchart illustrating an embodiment of a process to receive a desired mode from a user interface and adjust the position of a mechanical stop accordingly where the desired mode is held until the mechanical stop is free.

FIG. 10C is a flowchart illustrating an embodiment of a process to receive a desired mode from a user interface and adjust the position of a mechanical stop accordingly where the desired mode is held until the mechanical stop is free. As before, steps that have been previously discussed are not discussed in detail here for brevity.

At 1000, a desired mode for the first position is received from a user interface, wherein the desired mode is selected from a plurality of modes. At 1020, it is determined if a first mechanical stop is in use. If so, a message indicating that the desired mode will not be immediately applied is displayed at 1022. As described above, a variety of messages may be displayed.

Once (or if) it is determined at step 1020 that the first mechanical stop is no longer in use, a new position is determined for the first mechanical stop based at least in part on the desired mode at 1002. In some embodiments, a new or second message is displayed, for example indicating that the first mechanical stop has been adjusted to reflect the desired mode.

At 1004, a position control for the first mechanical stop is set to a value which corresponds to the new position.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A propeller, comprising:
   a blade free to rotate about a longitudinal axis of the blade within at least a defined rotational range of motion;
   a first mechanical stop positioned to engage mechanically one or both of a first portion of the blade and a first structure coupled mechanically to the blade when the blade is in a first position at a first end of the defined rotational range of motion, wherein the first position is associated with hovering; and
   a second mechanical stop positioned to engage mechanically one or both of a second portion of the blade and a second structure coupled mechanically to the blade when the blade is in a second position at a second end of the defined rotational range of motion, wherein the second position is associated with forward flight;
   wherein:
   the blade rotates to the first position against the first mechanical stop when the propeller is rotated in a first direction and the blade rotates to the second position against the second mechanical stop when the propeller is rotated in a second direction;
   the first portion of the blade includes a first side of the blade and the second portion of the blade includes a second side of the blade;
   the first mechanical stop includes a first blade stopper configured to directly contact and mechanically stop the first side of the blade when the blade is in the first position;
   the second mechanical stop includes a second blade stopper configured to directly contact and mechanically stop the second side of the blade when the blade is in the second position; and
   a position of the first blade stopper is adjustable.

2. The propeller of claim 1 wherein the first structure is the same as the second structure.

3. The propeller of claim 1 wherein:
   the first structure and the second structure are a same rotatable bearing;
   a peg is connected to the rotatable bearing;
   the first mechanical stop includes a first peg stopper configured to mechanically stop the peg when the blade is in the first position; and
   the second mechanical stop includes a second peg stopper configured to mechanically stop the peg when the blade is in the second position.

4. The propeller of claim 1 wherein:
   the first structure and the second structure are a same rotatable bearing;
   a peg is connected to the rotatable bearing;
   the first mechanical stop includes a first peg stopper configured to mechanically stop the peg when the blade is in the first position;
   the second mechanical stop includes a second peg stopper configured to mechanically stop the peg when the blade is in the second position; and
   a position of the first peg stopper is adjustable.

* * * * *

UNITED STATES PATENT AND TRADEMARK OFFICE
CERTIFICATE OF CORRECTION

PATENT NO. : 11,702,188 B2
APPLICATION NO. : 17/574383
DATED : July 18, 2023
INVENTOR(S) : Damon Vander Lind and Todd Reichert It is certified that error appears in the above-identified patent and that said Letters Patent is hereby corrected as shown below:

In the Specification

Column 5, Line(s) 23 & 24, delete "(i.e., al)" and insert --(i.e., $\alpha 1$)--, therefor.

Column 5, Line(s) 35, after "where", delete "al az." and insert --$\alpha 1 \neq \alpha 2$.--, therefor.

Column 7, Line(s) 24, after "rotating", insert --in--.

In the Claims

Column 14, Line(s) 41, Claim 2, after "claim 1", insert --,--.

Column 14, Line(s) 43, Claim 3, after "claim 1", insert --,--.

Column 14, Line(s) 53, Claim 4, after "claim 1", insert --,--.

Signed and Sealed this
Fourteenth Day of November, 2023

Katherine Kelly Vidal
*Director of the United States Patent and Trademark Office*